United States Patent [19]

Yoshitoshi et al.

[11] 4,143,247

[45] Mar. 6, 1979

[54] AUTOMATIC SIGNAL LEVEL ADJUSTING CIRCUITS FOR USE IN TELEPHONE SETS

[75] Inventors: Makoto Yoshitoshi, Musashino; Isao Kawashima, Yokosuka; Hideo Kishimoto; Masaaki Terai, both of Yokohama; Kazumi Kato, Hino, all of Japan

[73] Assignee: Nippon Telegraph and Telephone Public Corporation, Tokyo, Japan

[21] Appl. No.: 844,969

[22] Filed: Oct. 25, 1977

[30] Foreign Application Priority Data

Nov. 2, 1976 [JP] Japan ................... 51-132061

[51] Int. Cl.² .......................................... H04M 1/00
[52] U.S. Cl. ................................ 179/81 R; 179/16 F
[58] Field of Search ................ 179/81 R, 81 A, 16 F, 179/77, 170.2, 170.8, 170 NC

[56] References Cited

U.S. PATENT DOCUMENTS 3,989,902  11/1976  Coupland .................... 179/16 F Primary Examiner—Kathleen H. Claffy
Assistant Examiner—Joseph A. Popek
Attorney, Agent, or Firm—Charles E. Pfund

[57] ABSTRACT

There are provided a current detecting resistance element connected in series with a loop for supplying current to a telephone set, a switching circuit including a three terminal semiconductor switching element connected to be ON.OFF controlled by the voltage drop across the resistance element, and an impedance element controlled by the ON.OFF operation of the switching element to be connected across the loop for adding AC loss.

15 Claims, 13 Drawing Figures

AUTOMATIC SIGNAL LEVEL ADJUSTING CIRCUITS FOR USE IN TELEPHONE SETS

BACKGROUND OF THE INVENTION

This invention relates to an automatic signal level control circuit for use in telephone sets.

The length of the subscriber's line interconnecting a telephone set and a telephone office is determined by the location of the subscriber's station and not constant. For this reason, the signal level of the speech varies for different subscribers. Accordingly, in a telephone system, it is desirable to assure adequate and uniform signal level, that is signal level at the time of speech irrespective of the length of the subscriber's line between the telephone set and the telephone office.

According to one prior art solution of this problem, the length of the subscribers line was detected by a varistor which responds to the variation in the voltage across input terminals of a telephone circuit for inserting an AC resistance corresponding to the variation in the voltage-resistance characteristic of the varistor in parallel with the telephone circuit, that is a loop for passing current to the telephone set. Such method has been used in type 1500D telephone sets manufactured by Western Electric Co., in U.S.A., and described by J. H. Ham et al. in an article "A Touch-Tone Caller for Station Sets, I.E.E.E. Transactions on Communication and Electronics Vol. No. 65, 1963 pp 17–24".

Figure 1:
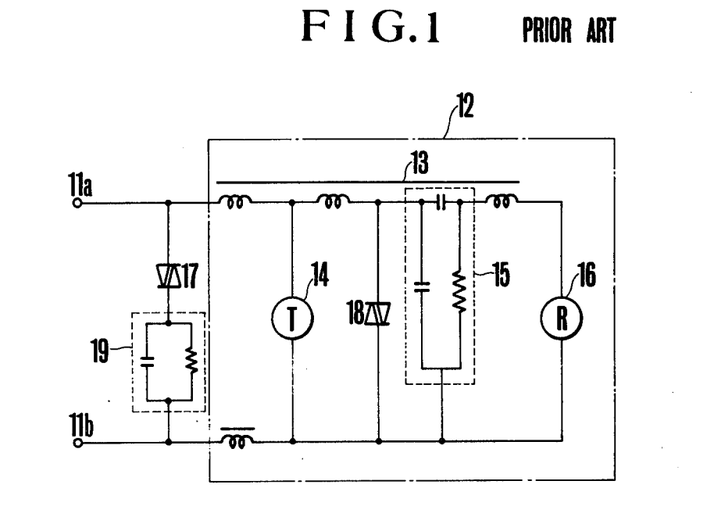
FIG. 1 is a connection diagram showing one example of the prior art signal level adjusting circuit utilized in a telephone set.

FIG. 1 of the accompanying drawing shows elements related to the automatic signal level adjusting circuit utilized in the type 1500D telephone set which comprises input terminals 11a and 11b of the telephone set, a conventional telephone set circuit 12 including a hybrid coil 13, a transmitter 14, a balancing network 15, a varistor 18 for side tone balance, and a receiver 16, a varistor 17 connected across terminals 11a and 11b for adjusting transmitting and receiving signal levels, an impedance 19 connected in series with varistor 17 for adding AC loss.

In the circuit, the adjustment of the signal level of the transmitting and receiving signals is effected in the following manner. Where the subscriber's station is closely located to the telephone office and hence where the length of the subscriber's line is short, the voltage across the input terminals 11a and 11b is high since the line loss is small. Accordingly, the AC resistance of the varistor decreases substantially, so that the additional AC loss impedance 19 is connected across terminals 11a and 11b thus suppressing the level of the speech signal. On the other hand where the subscriber's station is remotely located from the telephone office, the length of the subscriber's line increases thus increasing the line loss. Accordingly, the voltage across input terminals decreases and the AC resistance of the varistor increases greatly, so that the series impedance of the varistor 17 and the impedance 19 become high, thus decreasing the parallel loss.

However, the automatic signal level adjusting circuit described above has various defects as follows.

Firstly, the DC resistance of the telephone set is generally lower than the relay resistance in the telephone office. Accordingly, the voltage across the input terminals 11a and 11b does not vary in proportion to the length of the subscriber's line, so that the amount of loss inserted in parallel across the terminals of the telephone set is liable to be affected by the depression in the characteristic of the varistor 17.

Secondly, as the side tone balance has been effected by taking a case wherein the subscriber's line is long is taken as a reference, the side tone balance is upset in a telephone set located closely to the telephone office, thereby increasing the side tone. This greatly degrades the transmission performance. In order to solve this problem it is necessary to suitably correlate the characteristics of the varistors 17 and 18. However, it is difficult to prepare varistors having the correlative characteristic, thereby increasing the cost of manufacturing.

Thirdly, since the voltage-resistance characteristic of the varistor is non-linear, the speech would be deformed.

Fourthly, where an AC signal having the same frequency band as the voice signal is used as the dial signal of the telephone set, the distortion characteristic of the dial signal would be degraded with the result that the push button dial signal receiver installed in the telephone office would misoperate, thus causing miss dialling.

According to another prior art technique the variation in the current supplied to the telephone set is detected to automatically adjust the signal level. This technique is described, for example, in U.S. Pat. No. 3,582,564 to Knauer dated June 1, 1971. According to the circuit arrangement disclosed in this patent, a current detection resistor is inserted in series with the loop for supplying current to the telephone set, the base and emitter electrodes of a transistor are connected across the current detection circuit and the collector and base electrodes are connected in parallel with the receiver or the transmitter via a capacitor.

According to this arrangement, instead of detecting the voltage across the input terminals of a telephone set the current supplied to the telephone set is detected and the amount of loss afforded by the nonlinear characteristic of a transistor is adjusted in accordance with the detected value of the current. Consequently, the variation in the amount of added loss caused by the difference in the characteristics of the elements used is smaller than the case of using varistors. However, in this arrangement too, since the nonlinear characteristic of the transistor is used for adjusting the amount of the added loss, where a push button dial is used, the dial signal would be distorted by the non-linear characteristic of the transistor thereby causing a miss dialling.

Furthermore, according to this arrangement, since the length of the subscriber's line is discriminated by the magnitude of the supply current, although it is possible to increase the sensitivity of adjusting the signal level than in the case of utilizing the varistor, the naturality of the speech would be impared because signal level adjusting circuit operates in response to the magnitude of an AC signal such as voice signal.

SUMMARY OF THE INVENTION

Accordingly, it is an object of this invention to provide an improved automatic signal level adjusting circuit for a telephone set capable of automatically adjusting the signal level with a low distortion in accordance with the length of the subscriber's line.

Another object of this invention is to provide a novel automatic signal level adjusting circuit for use in a telephone set capable of constructing a telephone set circuit with electronic elements.

Still another object of this invention is to provide an improved automatic signal level adjusting circuit for use in a telephone set which does not give any dynamic adverse effect upon AC signals such as transmission and receiving voice signals, and push button dial signals.

According to one embodiment of this invention, there is provided an automatic signal level adjusting circuit for use in a telephone set comprising a current detecting resistance element serially connected in a loop for supplying current to the telephone set, a switching circuit including at least one three terminal semiconductor switching element which is ON.OFF controlled in response to the voltage drop across the resistance element, and an impedance controlled by the ON.OFF operation of the switching element to be connected across the loop for adding AC loss.

According to another embodiment of this invention there is provided an automatic signal level adjusting circuit for use in a telephone set comprising a current detecting resistance element serially connected in a loop for supplying current to the telephone set, a first three terminal semiconductor switching element connected to be ON·OFF controlled in response to the voltage drop across the resistance element, a second three terminal semiconductor switching element connected to be ON·OFF controlled in response to the ON·OFF operation of the first three terminal semiconductor switching element, a first impedance connected in series with the output terminal of the second three terminal semiconductor switching element for adding AC loss, means for connecting the serially connected second three terminal semiconductor switching element and the first impedance element across the loop, and a second impedance connected between an imput terminal of the first three terminal semiconductor switching element and the current detecting resistance element for adding AC loss.

According to still another embodiment of this invention there is provided an automatic signal level adjusting circuit for use in a telephone set comprising a current detecting resistance element connected in series with a loop for supplying current to the telephone set, a semiconductor controlled rectifier with its gate and cathode electrodes connected across the resistance element, an impedance connected in series with the anode electrode of the controlled rectifier for adding AC loss, and means for connecting the serially connected controlled rectifier and the impedance in parallel across the loop.

In the above embodiment, however, it should be noted that connecting in series the current detecting resistance element to the loop for supplying the current to the telephone set means not only the above case but also the case in which the current detecting resistance element is included in the telephone set as a circuit component thereof. Accordingly, in the following description, the telephone set means the main part of a telephone set including a transmitter and a receiver.

BRIEF DESCRIPTION OF THE DRAWINGS

Further objects and advantages as well as the construction and operation of the novel signal level adjusting circuit of this invention can be more fully understood from the following detailed description taken in conjunction with the accompanying drawings in which.

DETAIL DESCRIPTION OF THE PREFERRED EMBODIMENTS

Figure 2:
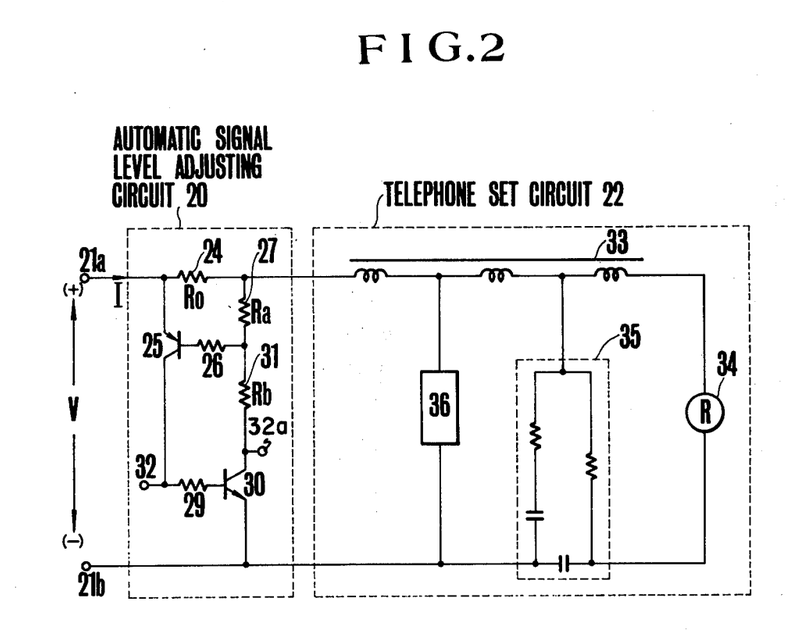
FIG. 2 is a connection diagram showing one example of the signal level adjusting circuit embodying the invention.

FIG. 2 shows a telephone set circuit provided with one embodiment of the automatic signal level adjusting circuit 20 according to this invention. As shown, a telephone set circuit 22 is connected through a current detection series resistor 24 across input terminals 21a and 21b which are connected to a telephone office through a subscriber's line, not shown. On the side of the resistor 24 connected to the input terminal 21a is connected the emitter electrode of a PNP transistor 25 which is ON·OFF controlled by the voltage drop across the resistor 24, and the base electrode of transistor 25 is connected to one terminal of the telephone set circuit 22 via a base current limiting resistor 26 and a resistor 27 for setting the width of hysteresis and for adding AC loss as will be described later. The collector electrode of transistor 25 is connected to the base electrode of a NPN type switching transistor 30 via base current limiting resistor 29. The emitter electrode of transistor 30 is connected to the input terminal 21b, whereas the collector electrode is connected to the juncture between resistors 26 and 27 through a resistor 31 for setting the width of hysteresis and for adding AC loss as will be described later. The collector electrodes of transistors 25 and 30 are connected to control output terminals 32 and 32a respectively. The control signal derived out through these output terminals is applied to various signal level adjusting circuits as will be described in connection with various embodiments of this invention. The telephone set circuit 22 has a construction similar to that of a well known telephone set circuit and shown as comprising a hybrid coil 33, a receiver 34, a balancing network 35, and an audio frequency AC signal circuit 36 including a transmitter and an amplifier, not shown. In a telephone set utilizing a key or push button dial, the source 36 also includes a push button dial signal oscillator.

The operation of the circuit shown in FIG. 2 will now be described with reference to FIG. 3 which shows the relationship between the DC current I supplied to the telephone set and the voltage across terminals 21a and 21b and the base-emitter voltage $V_{BE}$ of the current detecting transistor 25.

Considering now a case wherein the voltage across the terminals 21a and 21b increases from zero volt, the base current of transistor 25 will not flow until the voltage drop across the series resistor 24 reaches a threshold voltage $V_{th}$ across the base emitter electrodes of transistor 25. Accordingly, both transistors 25 and 30 are maintained in their OFF states. At this time the voltage across the input terminals 21a and 21b is determined by the DC resistance values $R_T$ of the telephone circuit 22 and the resistance value $R_O$ of resistor 24. Denoting the line current by I, the terminate voltage can be given by an equation $V = (R_T + R_O) I$. On the other hand, the voltage across resistor 24 is applied across the base and emitter electrodes of transistor 25.

As the voltage increases further to a point $V_O = V_{th}$ that is $$V_1 = (R_O + R_T)/R_O \, V_{th} \qquad (1)$$

a small current begins to flow through the base electrode of transistor 25, with the result that collector current also flows. This collector current of transistor 25 flows to the base electrode of transistor 30 via resistor 29 thus instantly turning ON transistor 30. Consequently, the collector current of this transistor flows through resistors 27 and 31, and the base-emitter voltage of transistor 25 becomes equal to the sum of the voltage drop $V_a$ across resistor 27 and the voltage drop $V_O$ across resistor 24. Thereafter, the base-emitter voltage of the transistor 25 increases as the voltage drop across resistor 27 increases their rendering transistors 25 and 30 fully conductive.

Consequently, when the base-emitter voltage $V_{BE}$ of transistor 25 reaches the threshold voltage $V_{th}$ and transistors 25 and 30 become ON, resistors 27 and 31 are connected in parallel with the telephone set circuit 22 to provide additional loss. The voltage V across terminals 21a and 21b of the telephone set circuit is expressed by an equation $$V = \left( R_0 + \frac{R_T(R_a + R_b)}{R_a + R_b + R_T} \right) I$$

where $R_a$ and $R_b$ represent the resistance values of resistors 27 and 31 respectively.

The base-emitter voltage $V_{BE}$ remains substantially constant irrespective of the increase in the added current since transistor 25 is fully conductive. Even when the terminal voltage across terminals 21a and 21b decreases to a value at which transistors 25 and 30 have been rendered ON during the increase of the terminal voltage these two transistor are maintained in their ON states since there is the voltage drop $V_a$ across resistor 27. As the terminal voltage decreases further until the base-emitter voltage of transistor 25 reaches a threshold voltage $V'_{th}$ (actually it is slightly higher than $V_{th}$), that is when a condition $$V_{th} = V_a + V_O \qquad (2)$$

is reached, two transistors 25 and 30 are turned OFF. The terminal voltage $V_2$ across the input terminals 21a and 21b at this time is expressed by the following equation 3 which is derived from equation 2.

$$V_2 = \frac{R_0 + \frac{(R_a + R_b) \cdot R_T}{R_a + R_b + R_T}}{R_0 + \frac{R_a \cdot R_b}{R_a + R_b + R_T}} \cdot V_{th} \qquad (3)$$

Figure 3:
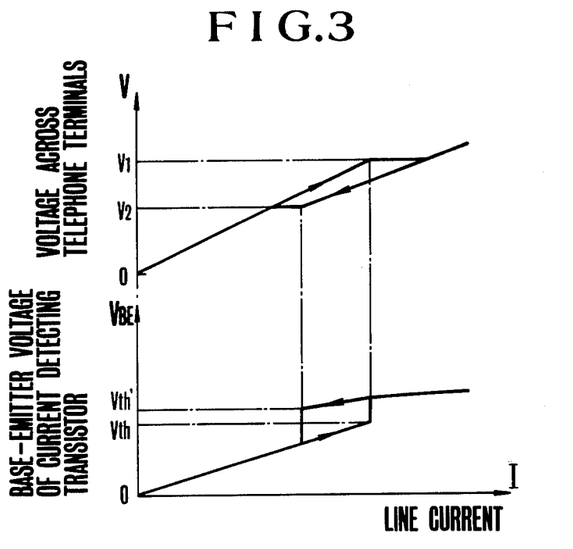
FIG. 3 is a graph showing the relationship between the line current and the terminal voltage of the telephone set and the voltage across the base and emitter electrodes of a transistor for detecting the current utilized in the embodiment shown in FIG. 2.

As can be clearly understood from the foregoing description the V-I characteristic across the input terminals 21a and 21b and the $V_{BE}$ characteristic manifest hysteresis characteristics as shown in FIG. 3, the point at which the current transits being determined by the resistance value $R_O$ of the current detection resistor 24 at the time of changing from OFF to ON state as shown by equation 1 whereas the time of changing from ON to OFF state being determined by the resistance values $R_O$, $R_a$ and $R_b$ of resistors 24, 27 and 31 respectively as shown by equation 3. When two transistors 25 and 30 are ON, a posotive voltage substantially equal to the voltage of the input terminal 21a appears at the control output terminal 32 whereas a negative voltage on the input terminal 21b appears on the other input terminal 21b.

Since the DC resistance of a telephone set is generally low, in a telephone set closely located to the telephone office, the current supplied to the telephone set is very large as has been pointed out before. For this reason, the value $R_O$ of the current detecting resistor 24 is selected according to an equation $$R_O = V_{th}/I_O \qquad (4)$$

where $I_O$ represents the current whose level is desired to be adjusted. Accordingly, in a telephone set which is located at a short distance from the telephone office and current larger than $I_O$ is supplied, transistors 25 and 30 are always in their ON states, so that resistors 27 and 31 for setting the hysteresis width and for providing AC loss are connected across input terminals 21a and 21b. When the added loss is connected across the input terminals, the levels of the AC signals such as speech signals and the push button dial signal are suppressed by a predetermined amount.

On the other hand, in a subscriber remotely located from the telephone office the current supplied to the telephone set is decreased by the line resistance so that the voltage drop across the current detecting resistor 24 will not reach the threshold voltage $V_{th}$. Under these conditions transistors 25 and 30 are in their OFF state whereby the resistor for providing the AC loss will not be connected.

In a telephone set, a common line is used for supplying DC current and for exchanging AC signals utilized for speech so that in the level adjusting circuit of this invention too, the operating point determined by the DC supplied is shifted by the AC signal current superposed thereon. However, according to this invention, inasmuch as hysteresis characteristics are provided for the ON.OFF operations of transistors 25 and 30, by setting the width of hysteresis to be larger than the peak to peak level of the AC signal it becomes possible to ignor the non-linear characteristic of the transistor thereby eliminating non-linear distortion. More particularly, when the circuit is designed by considering above described conditions, and where the DC operating point of the circuit is set to a point near the transition point of the hysteresis characteristic the state of the circuit is merely changed from OFF to ON or from ON to OFF by the superposed AC signal and the operating point after such shifting is always maintained at a stable state. Accordingly, the AC loss is added in the form of pure resistance so that there is no fear of resulting in any non-linear distortion.

The value of the current detecting resistor 24 is determined according to equation 4 and since generally $V_{th} \simeq$ $0.5 \simeq 0.6$ Volt and $I_O \simeq 50$ mA, the resistance value is equal to from several ohms to 20 ohms. As a consequence, this resistance value does not contribute to any appreciable increase in the resistance of the telephone set. Moreover, as above described, since the resistance of the telephone set is inherently small, even a small difference in the length of the subscriber's line of a subscriber located close to the telephone office results in a large variation in the current supplied to the telephone set such variation is less effected by the electric characteristic of the current detecting resistor 24, although it is slightly varied from element to element. Even when the current supplied to the telephone set changes greatly the operating points of the transistors 25 and 30 are merely shifted. This, in combination with the hysteresis characteristic described above eliminates adverse effect upon voice frequency AC signals and does not impare the naturality of speech.

Figure 4:
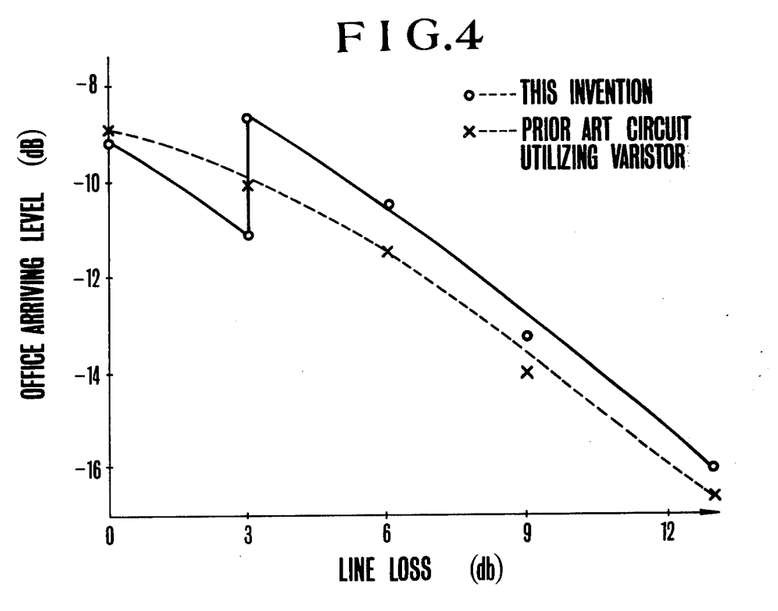
FIG. 4 is a graph showing the relationship between the level of a signal arriving at the telephone office and the line loss.
Figure 5:
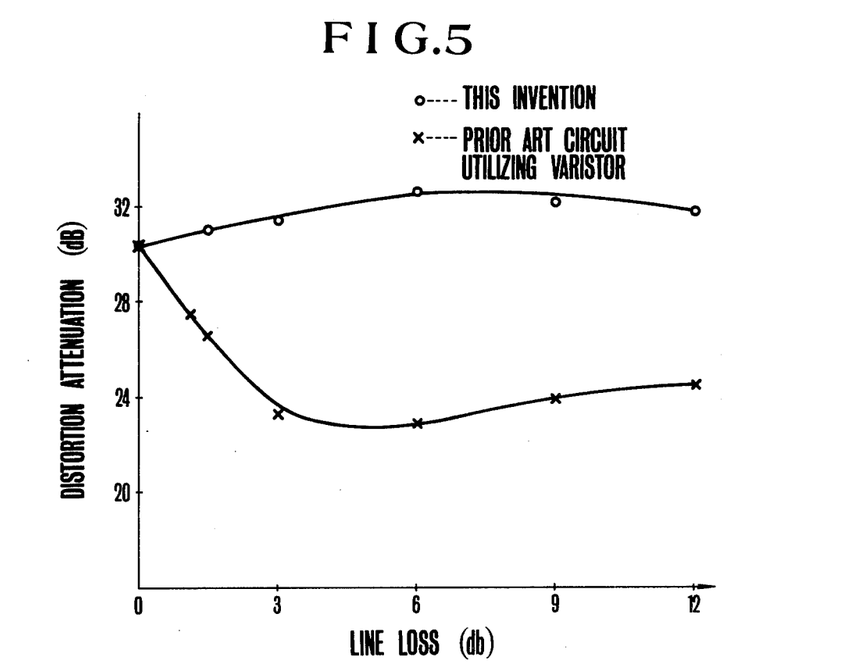
FIG. 5 is a graph comparing the distortion attenuation-line loss characteristics of the embodiment shown in FIG. 2 and a prior art signal level adjusting circuit.

FIGS. 4 and 5 are graphs which compare the office arrival level-line loss characteristics and the distortion attenuation-line loss characteristics of the automatic signal level adjusting circuit shown in FIG. 2 and of the prior art signal level adjusting circuit utilizing a varistor. These characteristics were obtained when a line having a diameter of 0.4 mm was used and an AC signal having a frequency of 1336 $H_z$ was used. These graphs show that the line loss was about 3dB, and that the AC loss was added at a position about 1.3 km spaced from the telephone office. The graph of FIG. 4 shows the office arrival level was improved over the prior art where the telephone set is remotely located from the office. FIG. 5 shows that according to this invention, the amount of the distortion attenuation is substantially constant irrespective of the line loss, and that the percentage of distortion has been improved greatly over the prior art circuit.

Turning back to FIG. 2, resistors 27 and 31 for setting the hysteresis width also function as parallel loss resistors. However, these parallel loss resistors can also be used to independently adjust the levels of a plurality of loads by utilizing the voltage variation at the control output terminals 32 and 32a.

Figure 6:
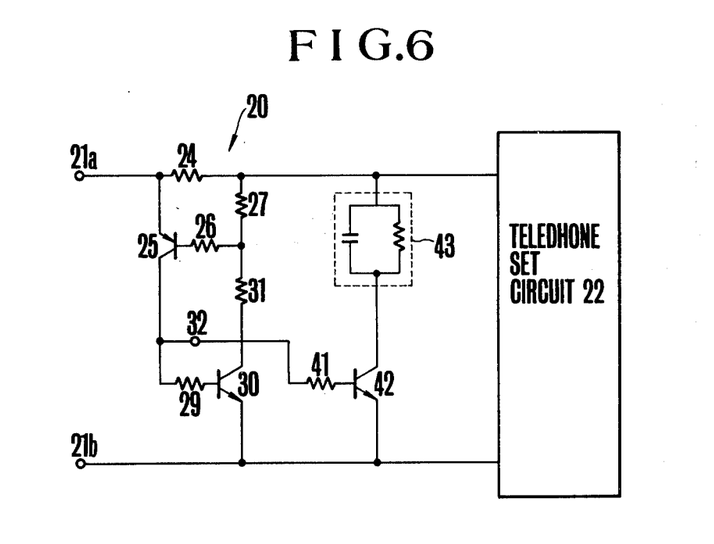
FIGS. 6 through 11 show various modifications of the signal level adjusting circuit embodying the invention.

FIG. 6 shows one example of such modification in which elements corresponding to those shown in FIG. 2 are designated by the same reference numerals. FIG. 6 is characterized in that the base electrode of a NPN transistor 42 is connected to the control output terminal 32 via a resistor 41. The collector electrode of transistor 42 is connected to the juncture between resistors 24 and 27, that is one input terminal of the telephone set circuit 22 via an loss adding network 43 whereas the emitter electrode is connected to the other input terminal of the telephone set circuit 22.

In FIG. 2, the direction of the supplied current may be reversed. then, the polarity of the voltage appearing across input terminals 21a and 21b also reverses. Then, the operation as in FIG. 2 can be obtained by changing the current detecting transistor 25 to NPN type and the switching transistor 30 to PNP type.

Figure 7:
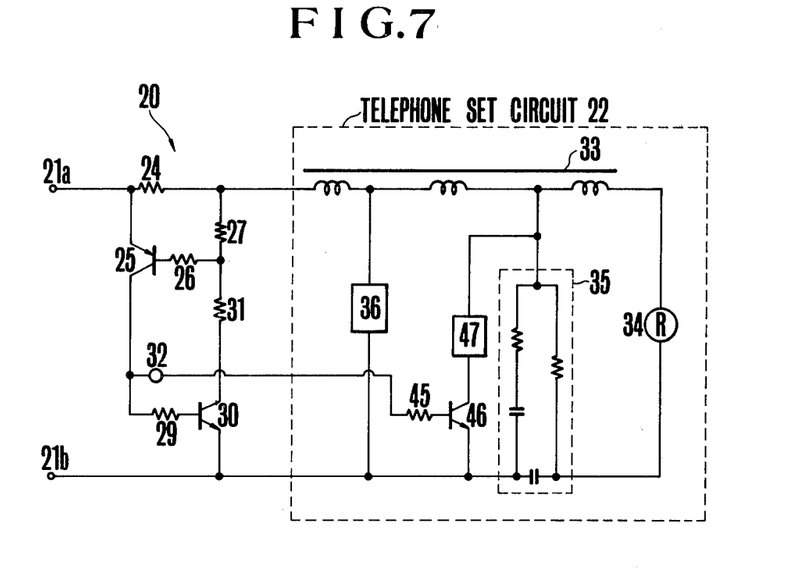

FIG. 7 shows still another embodiment of this invention in which the variation in the voltage at the control terminal 32 shown in FIG. 2 is used to the compensation of the balancing network 35. More particularly, the control output terminal 32 is connected to the base electrode of a NPN transistor 46 via a resistor 45 while the collector electrode is connected to one terminal of a balancing network 35 through a compensation adding impedance 47 having a value suitable for compensating for the balancing network for a short subscriber's line. The emitter electrode of transistor 46 is connected to the other terminal of the balancing network, that is the input terminal 21b of the telephone set 21b.

In this modification too, where the subscriber's line is short, resistors 27 and 31 act as an added loss for such AC signals as the speech signal and the push button dial signal in the same manner as in the previous embodiment. With the circuit construction shown in FIG. 7, the side tone unbalance caused by the connection of the added loss can be compensated for in a manner described hereunder. More particularly, when the current detecting transistor 25 is turned ON, the voltage at the input terminal 21a appears on the control output terminal 32, thus turning ON transistor 46. Consequently, in a short subscriber's line added impedance 47 with compensating action is connected in parallel with the balancing network 35, thereby compensating for the side tone unbalance caused by the connection of the parallelly added resistors 27 and 31 to the line. In this case, the value of the added impedance with compensation action can be determined by taking into consideration the line conditions including parallelly added resistors 27 and 31. Consequently, different from the prior art system it is not necessary to prepare varistors having the correlative characteristic but can assure high quality speech of improved side tone performance over a wide range of the length of subscribers line.

Figure 8:
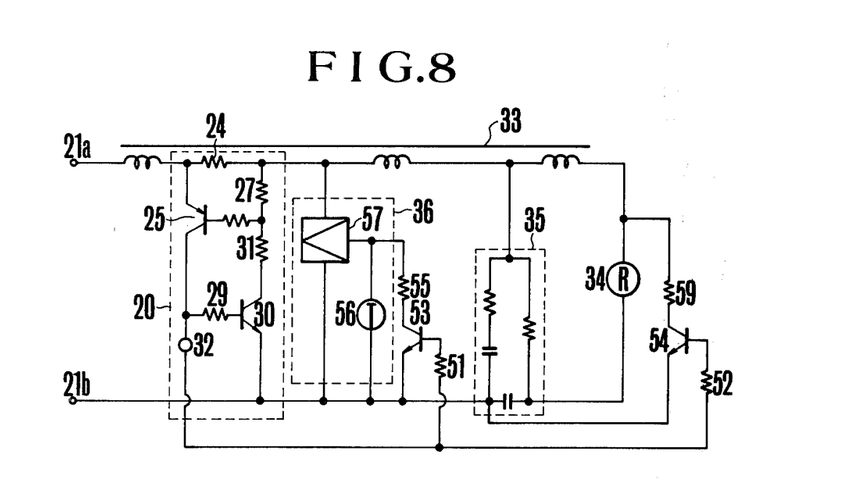

FIG. 8 shows still another embodiment of this invention in which the signal levels of the transmission and receiving signals are adjusted simultaneously by utilizing the variation in the voltage at the control output terminal. In this embodiment, the signal level adjusting circuit 20 is incorporated into the telephone set circuit 22. As shown in FIG. 8, the variation in the voltage appearing on the control output terminal 32 is applied to the base electrodes of transistors 53 and 54 respectively through current limitting resistors 51 and 52. The collector electrode of transistor 53 is connected to the input terminal of a transmitter amplifier 57 together with one terminal of transmitter 56 via a transmission signal added loss resistor 55. The transmitter 56 may be of the electromagnetic type. The transmitter 56 and the transmitter amplifier 57 correspond to the AC signal generating source 36 shown in FIG. 7. The collector electrode of transistors 54 is connected to the juncture between the receiver 34 and the hybrid coil 33 via a resistor 59, while the emitter electrode is connected to the input terminal 21b of the telephone set.

The embodiment shown in FIG. 8 operates as follows where the subscriber's line is short, the current detecting transistor 25 is ON so that transistors 53 and 54 are rendered conductive by the voltage of the control output terminal 32 concurrently with transistor 30. Consequently, resistors 55 and 59 for adding AC losses, are connected respectively in parallel with transmitter 56 and receiver 34 so as to simultaneously attenuate the levels of the transmission signal and receiving signal by different amounts. On the other hand, where the subscriber's line is long all transistors are maintained OFF and the losses are not added. In the circuit shown in FIG. 8, resistors 27 and 31 are not used for adding losses but used for setting the hysteresis width. For this reason, the values of these resistors are selected to be large. Thus, these resistors 27 and 31 do not provide any AC loss for the amplifier 57 but when their values are selected such that they also add loss to the output of the transmission amplifier, it is possible to omit resistor 55 and transistor 53.

Figure 9:
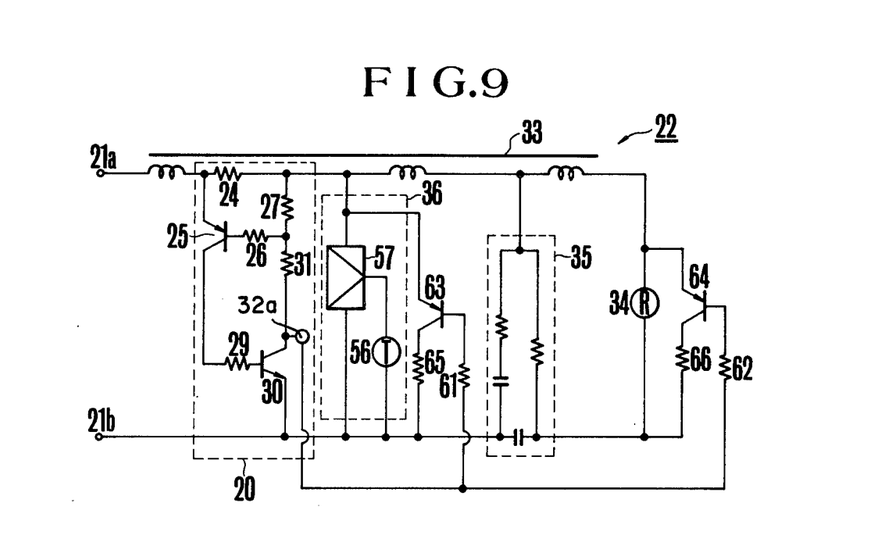

FIG. 9 shows another modification in which the variation in the voltage of the control output terminal 32a is used to adjust the levels of the transmission and receiving signals. In this embodiment, the signal level adjusting circuit 20 is incorporated into the telephone circuit 22, and the variation in the voltage of the control output terminal 32a is applied to the base electrodes of PNP transistors 63 and 64 respectively through current limitting resistors 61 and 62. The emitter electrode of transistor 63 is connected to the output of the transmission amplifier 57, whereas the collector electrode is connected to the input terminal 21b of the telephone set through a resistor 65 for adding parallel loss. The emitter electrode of transistor 64 is connected to the one terminal of receiver 34 whereas the collector electrode is connected to the other terminal of receiver via a resistor 66 for adding parallel loss.

The modification operates as follows: Where the subscriber's line is short, both transistors 25 and 30 are rendered ON. Under these conditions, the voltage appearing on control output terminal 32a is substantially equal to the voltage of the input terminal 21b so that the base currents of the transistors 63 and 64 flow through resistors 61 and 62 respectively. Consequently, transistors 63 and 64 are also turned ON, thus connecting resistor 65 for adding loss to transmission amplifier 57, in other words for adding loss to the transmitter 57, and connecting resistor 66 for adding loss to the receiver 34. On the other hand, where the subscriber's line is long transitor 25 is OFF and the DC voltage appearing on the control output terminal 32a is equal to the emitter voltages of transistors 63 and 64. As a consequence, transistors 63 and 64 are also turned OFF and no parallel loss is connected. Although, transmitter 56 and transmission amplifier 57 are not shown in the source of AC signal 36, a push button dial signal source may be included in this source 36.

Figure 10:
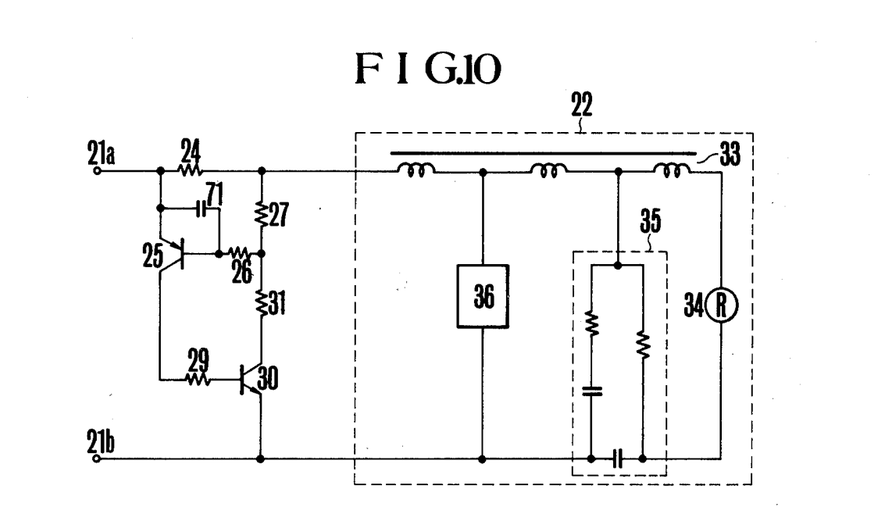

FIG. 10 shows still another modification of this invention in which a capacitor 71 is connected between the base and emitter electrodes of current detecting transistor 25 for the purpose of stabilizing the level adjusting operation against the noises caused by ON.-OFF operations of a hook switch and a switch board. As has already been described in connection with FIG. 2, the circuit operates or not depending upon whether the base-emitter voltage of current detecting transistor 25 reaches the threshold value $V_{th}$ or not. Thus, the capacitor 71 connected across the base and emitter electrodes of transistor 25 constitutes a low pass filter for the current detecting resistors 24 whereby the effect of the impulsive noises caused by the switch board and surge currents caused by ON.OFF operations of a hook switch which appear across resistor 24 will not appear across the base and emitter electrodes of transistor 25. Thus, it is possible to provide a signal level adjusting circuit whose operation is determined principally by the DC operating point.

Figure 11:
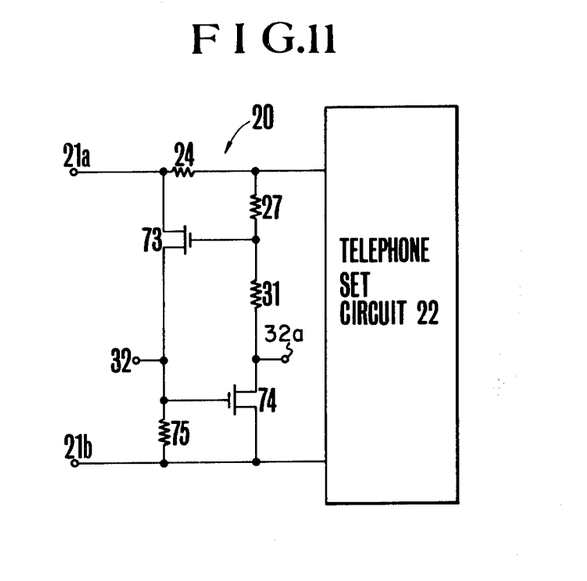

FIG. 11 shows yet another modification of this invention, in which the current detecting transistor 25 and the switching transistor 30 are substituted by field effect transistors 73 and 74. Since these transistors are of the voltage controlled type, the gate electrode of field effect transistor 74 is connected to the input terminal 21b via resistor 75. This modification operates in the same manner as the embodiment shown in FIG. 2.

Figure 12:
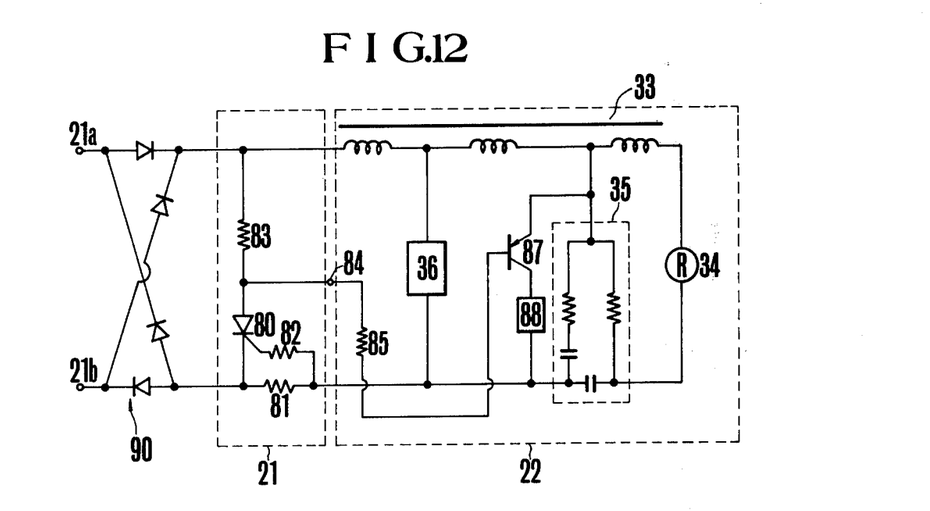
FIG. 12 shows another modification of this invention utilizing a silicon controlled rectifier as the semiconductor switching element and FIG. 13 is a connection diagram showing the application of the automatic signal level adjusting circuit applied to an electronic telephone set.

FIG. 12 shows yet another modification of the automatic signal level adjusting circuit 20 of this invention in which the voltage drop across the current detecting resistor element is used to control a silicon controlled rectifier 80, and in which elements identical to those shown in FIG. 2. are designated by the same reference charactors. As shown in FIG. 12, the cathode electrode of the silicon controlled rectifier 80 is connected to the terminal on the side of input terminal 21b of the current detecting resistor 81 which is connected in series in the loop for supplying current to the telephone set, whereas the terminal of resistor 81 on the side of the telephone set 22 is connected to the gate electrode of the silicon controlled rectifier 80. The anode electrode of the silicon controlled rectifier 80 is connected to one input of the telephone set circuit 22 via resistor 83 for adding AC loss. Furthermore, the anode electrode of the silicon controlled rectifier 80 is connected to the base electrode of a transistor 87 through a control output terminal 84 and a current limiting resistor 85, while the emitter electrode of transistor 87 is connected to one terminal of a balancing network 35. The collector electrode of transistor 87 is connected to the other side of the balancing network 35 through an impedance 88 for compensating for the balancing network.

In this embodiment, a diode bridge circuit 90 is connected between the input terminals 21a and 21b and the automatic signal level adjusting circuit 20 so as to prevent the reversal of the polarity of the voltage impressed upon the level adjusting circuit 20 and the telephone set circuit caused by the reversal of the polarity of the voltage between the telephone office and the subscriber's line.

This modification operates as follows: Where the subscriber's line is short, the voltage drop across resistor 81 is larger than the gate turn ON voltage of the silicon controlled rectifier 80 thus turning ON the same. Consequently, resistor 83 for adding AC loss is connected across the input terminals of the telephone set circuit. When the silicon controlled rectifier turns ON its anode voltage becomes substantially equal to the voltage of input terminal 21b thus turning ON transistor 87. As above described, in this embodiment, compensation impedance 88 is connected in parallel with the balancing network 35 thus compensating the same. As is well known in the art once rendered conductive a silicon controlled rectifier continues its ON state unless its anode current is decreased below a predetermined holding current. For this reason, this modification also functions in the same manner as previous embodiments in which hysteresis characteristic is given to the ON.OFF switching operation of a transistor. Accordingly, the circuit of this embodiment does not affect AC signals.

Figure 13:
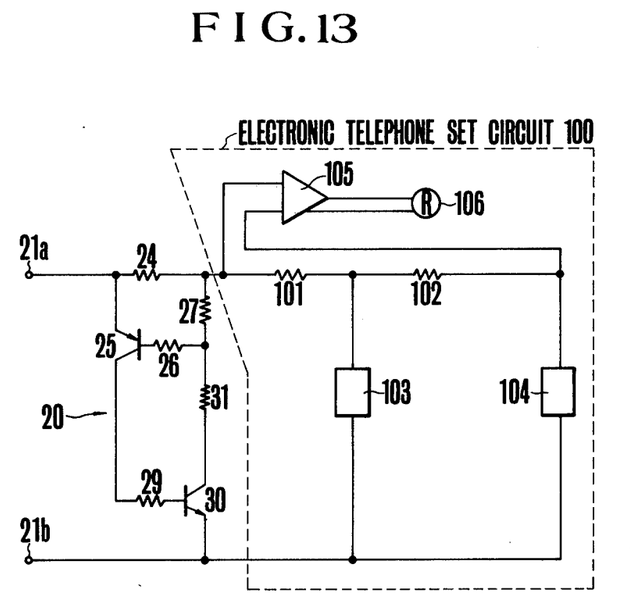

FIG. 13 shows another embodiment of this invention in which the automatic signal level adjusting circuit 20 is incorporated into an electronic telephone set circuit 100. The automatic signal level adjusting circuit 20 is identical to that shown in FIG. 2. The telephone set circuit 100 comprises serially connected resistors 101 and 102, a source of AC signal 103 including a transmitter, a push button dial or the like, a balancing network 104, an amplifier 105, and a receiver 106.

It should be understood that the invention is not limited to the particular embodiments described above and that many changes and modifications may be made without departing the scope of this invention. For example, in the embodiment shown in FIG. 2, instead of inserting a single signal level adjusting circuit 20 in a loop for supplying current to a telephone set, it is also possible to insert a plurality of signal level adjusting circuits in the same loop and by varying the ON levels of respective current detecting transistors it is possible to make more uniform the signal levels of respective subscribers at lower distortion percentages. Furthermore instead of using a resistor for adding AC loss, combinations of a resistor, a capacitor and an inductance can also be used.

What is claimed is:

1. An automatic signal level adjusting circuit for use in a telephone set comprising a current detecting resistance element serially connected in a loop for supplying current to said telephone set, a switching circuit ON-OFF controlled in response to the voltage drop across said resistance element, and an impedance element controlled by the ON-OFF operation of said switching circuit to be connected across said loop for adding AC loss, said switching circuit comprising two three terminal semiconductor switching elements, one of the switching elements is connected to be ON-OFF controlled in response to the voltage drop across said current detecting resistance element, and the other switching element is connected to be ON-OFF controlled in response to the operation of said one switching element and connected in series with said impedance for adding AC loss.

2. The automatic signal level adjusting circuit according to claim 1 wherein each of said three terminal semiconductor switching elements comprises a bipolar transistor.

3. The automatic level adjusting circuit according to claim 1 wherein each of said three terminal semiconductor switching elements comprises a field effect transistor.

4. The automatic signal level adjusting circuit according to claim 1 which further comprises an additional three terminal semiconductor switching element ON-OFF controlled by the operation of said first mentioned three terminal semiconductor switching element, means for connecting said impedance for adding AC loss in series with the output of said additional three terminal semiconductor switching element, a balancing network of said telephone set, and means for connecting said serially connected additional three terminal semiconductor switching element and said impedance in parallel with said balancing network.

5. An automatic signal level adjusting circuit according to claim 1 which further comprises a balancing network of said telephone set, and means for connecting said serially connected other three terminal semiconductor switching element and said impedance in parallel with said balancing network.

6. An automatic signal level adjusting circuit for use in a telephone set comprising a current detecting resistance element serially connected in a loop for supplying current to said telephone set, a first three terminal semiconductor switching element connected to be ON.OFF controlled in response to the voltage drop across said resistance element, a second three terminal semiconductor switching element connected to be ON.OFF controlled in response to the ON.OFF operation of said first three terminal semiconductor switching element, a first impedance connected in series with the output terminal of said second three terminal semiconductor switching element, for adding AC loss, means for connecting said serially connected second three terminal semiconductor switching element and said first impedance across said loop, and a second impedance connected between an input terminal of said first three terminal semiconductor switching element and said current detecting resistance element for adding AC loss.

7. The automatic signal level adjusting circuit according to claim 6 which further comprises a third three terminal semiconductor switching element connected to be ON.OFF controlled in response to the ON.OFF operation of said first three terminal semiconductor switching element, a third impedance connected in series with the output terminal of said third semiconductor switching element for adding AC loss, and means for connecting the serially connected third semiconductor switching element and said impedance across said loop.

8. The automatic signal level adjusting circuit according to claim 7 wherein said serially connected third semiconductor switching element and said impedance are connected in parallel with a balancing network of said telephone set.

9. The automatic signal level adjusting circuit according to claim 7 wherein said serially connected third semiconductor switching element and said impedance are connected in parallel with a transmitter of said telephone set.

10. The automatic signal level adjusting circuit according to claim 7 wherein said serially connected third semiconductor switching element and said impedance are connected in parallel with a receiver of said telephone set.

11. The automatic signal level adjusting circuit according to claim 7 wherein said serially connected third semiconductor switching element and said impedance are connected in parallel with a push button dial signal generator of said telephone set.

12. The automatic signal level adjusting circuit according to claim 6 which further comprises a third three terminal semiconductor switching element connected to be ON.OFF controlled by the ON.OFF operation of said second three terminal semiconductor switching element, a third impedance connected in series with the output terminal said third three terminal semiconductor switching element for adding AC load loss, and means for connecting said serial connected third impedance and said third three terminal semiconductor switching element across said loop.

13. The automatic signal level adjusting circuit according to claim 6 which further comprises a capacitor connected across said serially connected current detecting resistance element and said impedance for adding AC loss.

14. An automatic signal level adjusting circuit for use in a telephone set comprising, a current detecting resistance element connected in series with a loop for supplying current to said telephone set, a semiconductor controlled rectifier with its gate and cathode electrodes connected across said resistance element, and an impedance connected in series with the anode electrode of said controlled rectifier for adding AC loss, said serially connected controlled rectifier and said impedance being connected in parallel across said loop.

15. An automatic signal level adjusting circuit for use in a telephone set comprising a current detecting resistance element serially connected in a loop for supplying current to said telephone set, a switching circuit ON-OFF controlled in response to the voltage drop across said resistance element, and an impedance element controlled by the ON-OFF operation of said switching element to be connected across said loop for adding AC loss, said switching circuit comprising a silicon controlled rectifier connected to be ON/OFF controlled in response to the voltage drop across said current detecting resistance element and connected in series with said impedance across said loop for adding said AC loss.

* * * * *